United States Patent [19]
van Eendenburg et al.

[11] Patent Number: 6,099,887
[45] Date of Patent: Aug. 8, 2000

[54] PROCESS FOR PREPARING AN EDIBLE LAMINATED DOUGH AND EDIBLE LAMINATION DISPERSION THEREFOR

[75] Inventors: Jacobus van Eendenburg; Petronella Clementia Maria Weisenborn, both of Vlaardingen, Netherlands

[73] Assignee: LBI Acquisition Corp., North Haven, Conn.

[21] Appl. No.: 08/790,875

[22] Filed: Feb. 3, 1997

[30] Foreign Application Priority Data

Feb. 9, 1996 [EP] European Pat. Off. .............. 96200306

[51] Int. Cl.⁷ ...................................................... A21D 8/00
[52] U.S. Cl. .......................... 426/549; 426/506; 426/572; 426/573; 426/574; 426/576; 426/578; 426/656
[58] Field of Search ..................................... 426/549, 506, 426/572, 573, 574, 575, 576, 578, 618, 656

[56] References Cited

U.S. PATENT DOCUMENTS

| | | |
|---|---|---|
| 4,622,226 | 11/1986 | Ke . |
| 4,752,494 | 6/1988 | Tang et al. . |
| 4,956,193 | 9/1990 | Cain . |
| 4,971,826 | 11/1990 | Kato et al. . |
| 4,986,992 | 1/1991 | Glaros . |
| 5,190,776 | 3/1993 | Baumann . |
| 5,384,142 | 1/1995 | Henson . |
| 5,403,610 | 4/1995 | Murphy et al. ........................ 426/549 |
| 5,424,088 | 6/1995 | Christianson et al. . |
| 5,480,662 | 1/1996 | Boode-Boissevain et al. . |
| 5,501,869 | 3/1996 | Buliga et al. . |

FOREIGN PATENT DOCUMENTS

| | | |
|---|---|---|
| 529 891 | 3/1993 | European Pat. Off. . |
| 1442001 | of 0000 | Germany . |
| 94/28741 | 12/1994 | WIPO . |
| 95/26641 | 10/1995 | WIPO . |

*Primary Examiner*—Laurie Scheiner
*Attorney, Agent, or Firm*—Foley & Lardner

[57] ABSTRACT

Edible laminated dough, e.g. for making croissants or puff pastries, is prepared by combining a pre-dough with a lamination dispersion and subjecting the combination to rolling and folding to obtain a plurality of layers, wherein the lamination dispersion is a water-continuous dispersion, characterised in that the lamination dispersion has a pH of 5.0 or less and that the lamination dispersion comprises, calculated on the non-fat content of the lamination dispersion

| | |
|---|---|
| 40–80% | water |
| 17–55% | aggregate forming polysaccharide gelling hydrocolloid, and |
| 0.1–8% | non-gelling polysaccharide thickening hydrocolloid that provides at 20° C. and a shearrate of $50s^{-1}$ a viscosity of at least 50 mPas. |

10 Claims, No Drawings

PROCESS FOR PREPARING AN EDIBLE LAMINATED DOUGH AND EDIBLE LAMINATION DISPERSION THEREFOR

The invention relates to a process for preparing an edible laminated dough comprising combining a pre-dough with a lamination dispersion and subjecting the combination to rolling and folding to obtain a plurality of layers, wherein the lamination dispersion is a water continuous dispersion. It also relates to an edible lamination dispersion suitable for use in the process. Lamination dispersions are dispersions suitable for use in the preparation of laminated doughs, for example for making croissants, danish pastry and other laminated pastry, especially puff pastry. The typical lamination dispersion is a fat continuous product often having a dispersed aqueous phase, e.g. pastry shortening or margarine.

According to Bailey's Industrial Oil and Fat Products vol. 3 (1985), pp 109–110, puff pastry requires the use of a very specialized shortening. The fat is placed on top of the (pre-)dough and folded and rolled to form many alternating layers of dough and fat. The shortening has a tough waxy body over a wide temperature range. It must approximate the consistency of the dough to remain in a continuous unbroken layer as it stretches and becomes thinner. Puff pastry shortening almost always contains an aqueous phase. The fat keeps the layers of dough separate and flaky, and the moisture attributes the "puff" as it turns to steam during the baking process. Commonly 90% fat shortenings or 80% fat pastry margarines are used. For the preparation of other laminated doughs, similar types of lamination shortenings and margarines are used.

Lamination dispersions that do not have a continuous fat phase are known.

U.S. Pat. No. 5,190,776 discloses a low/no fat ingredient for use in producing laminated baked goods. It is prepared by mixing 40–70% cake crumbs, 9–30% sugar, 5–20% sugar syrup and 10–30% of a starch containing creme filling. The starch containing creme-filling consists of the same composition as this "low/no fat ingredient" but further includes flavouring ingredients such as flavours, spices and/or fruit material. The low/no fat ingredient has a moisture content of 2–20%, preferably 4–10%. Disadvantages of this ingredient are that it requires the availability and processing of cake crumbs and that it is very sweet. In view of the low moisture contents this ingredient will not have a continuous aqueous phase.

DOS 1442001 describes an O/W lamination dispersion. A purpose is to provide a product that can be prepared without the use of equipment required for making margarine or shortening. A further target is to avoid the use of high melting fats that can give a waxy mouthfeel to the baked product. The use of high melting fats is often required when using conventional margarine or shortening to obtain a proper consistency over a wide temperature range. The products illustrated in the examples consist of 75–82% fat, 16–21% water, 1.6–3.8% emulsifier and in some cases 0.08% carboxy methyl cellulose. The dispersion must have a firmness characterised by a minimum value for a parameter which is calculated from a given equation using data obtained with a cone-penetrometer.

EP 327 120 discloses oil-in-water type emulsions for lamination purposes ("rolling in") comprising 2–20% protein, 30–75% fat, 18–65% water and 0,1–5% phospholipid. The primary objective of EP 327120 is to reduce the fat content of the lamination dispersion, for nutritional reasons. It is essential that at least 40% preferably at least 50% of the phospholipids are mono acyl glycerol phospholipids else a stable product cannot be obtained. The presence of 30% fat is required to be able to get satisfactory "rolling-in" properties. It is preferred not to include materials such as starches, gums and preservatives. The mono acyl glycero phospholipids preferably comprise substantially lyso phosphatidyl choline and may further contain lysophosphatidylethanolamine and a small amount of lyso phosphatidylinositol, lyso phosphatidic acid and lyso phosphatidylserine. A disadvantage of this lamination dispersion is that the preferred phospholipid compositions are not readily available while more generally phospholipid compositions with a substantial amount of mono acyl glycero phospholipid are very expensive. Furthermore, such compositions are in practice produced with the use of phospholipase obtained from swine pancreatic juice which makes the products unacceptable to people of Islamic or Jewish religion.

WO 94/21128 discloses the use of an aqueous gel containing 20–50% of amylodextrin and 0–30% of β-glucan and/or pentosans as a fat-replacer for making laminated doughs.

This document does not teach to apply a non-gelling component in combination with a gelling component. According to the example the composition contains amylodextrin (=gelling component) and 1.9% β-glucan. However, β-glucan applied in this amount is also a gelling component.

EP 529 891 discloses a particular fragmented, granular amylose starch hydrolysate that can be used as a fatreplacer in foods. Amongst many other applications, use of the hydrolysate to replace a portion of the shortening in layered pastry articles is envisaged.

U.S. Pat. No. 4,752,494 describes a creme filling based on an intermediate water activity matrix. The matrix comprises 30–80% corn syrup, 0–25% maltodextrin, 0–10% lactose, 1–15% caseinate, 0.01–0.10% $Ca^{2+}$-ions, 0–15% water and optionally further ingredients like 0–10% polydextrose, 0–3% hydrocolloids and 0–5% modified starch. The matrix is heated to cause gelation of the caseinate under influence of the $Ca^{++}$-ions. The filling is then produced by adding fats and emulsifiers which modify the texture and provide desirable mouthfeel, and flavourings. The filling has a water activity of 0.6 to 0.8. The creme filling has a soft creamy texture and is intended for use particularly in baked products e.g. puffed pastries, pie cookies and other filled baked products. The low water activity is required to prevent moisture migration between the filling and the baked dough and to prevent microbial growth.

WO 94/28741 and WO 95/26641 describe a low fat emulsion that can be substituted in 1 to 1 proportions for butter, margarine, shortening, oil, lard, cream cheese and other fats called for in many foods. Three formulae are given which are applicable for different types of foods. For high fat products e.g. croissants, the formula is 27% butter, 46% corn maltodextrin (DE 1–20), 6% rice maltodextrin (DE 1–20), 8% pregelatinized starch, 10.7% water and a range of minor additives. First the butter is creamed, then the other materials are mixed in. Then the product can be rolled into a croissant dough.

The use of lamination dispersions with a continuous aqueous phase offers many potential advantages, some of which have been described in the above publications. Yet, the proposed dispersions not based on a continuous fat phase have not found acceptance and are to the best of our knowledge, not commercially applied. A reason for this, in addition to disadvantages described above, we suspect is that the disclosed lamination dispersions do not have a sufficiently good performance in lamination and/or that the resulting baked laminated products do not have satisfactory sensoric properties such as structure, volume, appearance, taste and/or mouthfeel.

We have studied these issues and we have found that improved lamination dispersions with a continuous aqueous phase can be obtained. We have found amongst other things, that it is not essential to use mono acylglycero phospholipid to obtain a stable dispersion and that it is not necessary to include at least 30% oil or fat or 27% butter to get good lamination performance.

For other applications than lamination dispersions, the literature includes many suggestions for fat replacers. In most cases the proposals concern non-plastic and/or soft products such as desserts, creams and cremes, ice cream, mayonnaise, dressings, cheese spreads and other products for spreading on bread or toast. Examples of such publications are WO 93/17564, U.S. Pat. No. 5,169,671, EP 605 217, WO 94/23587, EP 468,560, EP 596 546, EP 509 707, and EP 298 561. Such products are very different from lamination dispersions. For example, very low or zero fat table spreads currently on the market, typically have a firmness at 20° C. as measured by the Stevens value using a cylindrical probe with 4.4 mm diameter of 14–18 g. For a lamination dispersion, this value should be at least about an order of magnitude higher and preferably more. As described in Bailey's cited above, this firmness should be combined with special rheological properties to get good lamination performance.

The present invention provides a process for preparing an edible laminated dough comprising combining a pre-dough with a lamination dispersion and subjecting the combination to rolling and folding to obtain a plurality of layers, wherein the lamination dispersion is a water-continuous dispersion, characterised in that the lamination dispersion has a pH of 5.0 or less and that the lamination dispersion comprises, calculated on the non-fat content of the lamination dispersion

| | |
|---|---|
| 40–80% | water |
| 17–55% preferably 17–40% | aggregate forming polysaccharide gelling hydrocolloid, and |
| 0.1–8% | non-gelling polysaccharide thickening hydrocolloid that provides at 20° C. and a shearrate of 50 s$^{-1}$ a viscosity of at least 50 mPas. |

Above definition for the non-gelling polysaccharide thus means that any polysaccharide, if applied in an amount between 0.1 and 8 wt % in a composition, wherein any other component of the lamination dispersion other than fat and the gelling hydrocolloid is present, that provides the viscosity of >50 mPas under the conditions set out, is considered to be a non-gelling polysaccharide.

The invention also provides an edible lamination dispersion suitable for use in the present process, having a continuous aqueous phase, a pH of 5.0 or less and a Stevens value at 20° C. of 150–2000 g, optionally comprising up to 80% fat, and containing calculated on the non-fat contents of the dispersion

| | |
|---|---|
| 55–80% | water, |
| 20–40% | maltodextrin having a DE of less than 20, and |

-continued

| | |
|---|---|
| 0.25–5% | non-gelling polysaccharide gum hydrocolloid that provides at 20° C. and a shearrate of 50 s$^{-1}$ a viscosity of at least 50 mPas, which dispersion substantially does not contain protein. |

The invention provides a big advantage. Not having to use equipment normally employed for making fat continuous lamination dispersions provides much flexibility and ingredients can be employed that would give problems in the production lines for conventional fat-continuous products.

Products with reduced fat and/or calorie contents can be obtained. The use of fat considered less desirable because of their high contents of saturated and/or trans fatty acid residues can be avoided and fats with higher contents of mono- or poly-cis-unsaturated fatty acid residues can be used instead. Use of fats that have been modified by chemical modification by means of hydrogenation and/or interesterification can be avoided and, if so desired, also the use of fractionated fats can be avoided. Furthermore the products are less sensitive to temperature fluctuations thereby giving convenience to the baker. These and other benefits of water continuous lamination dispersions can be obtained in combination with improved lamination performance in the dough preparation and/or improved sensoric properties of the resulting laminated baked products compared with the results obtained with water-continuous lamination dispersions known from the prior art.

The structure of a lamination dispersion comprising both a fatphase and an aqueous phase can be assessed by means of microscopic investigation, as is well known in the art. Thus it can be seen which of the phases is continuous and which, if any, is present as a dispersed phase. An alternative and simple way to assess whether a product has a continuous aqueous phase is by means of electrical conductivity measurement. A fat continuous product without continuous aqueous phase has a conductivity that is practically zero. If a continuous aqueous phase is present, the conductivity is much higher.

For the dispersion to perform well in the lamination, it should not be too soft or else it will be pushed out of the dough on the sides and/or it will mix with the pre-dough such that the desired lamination character of the dough is not obtained. Nor should it be too hard because then it will tear holes in the pre-dough. The hardness or firmness can suitably be characterised by means of a Stevens LFRA Texture Analyzer (ex Stevens Advanced weighing Systems, Dunmore, U.K.). The product is stored at least 1 day at 5° C. and then for 24 hours at the measurement temperature t° C. The Stevens hardness at t° C., St t expressed in grams, is measured using a 4.4 mm round cylinder, loadrange 1000 g, operated "normal" and set at 10 mm penetration depth and 2.0 mm/s penetration rate. Some products are too firm (i.e. a loadrange of 1000 g is insufficient to enable the measurement) to be measured in this way. Then instead of the Stevens LFRA Texture Analyzer, a Texture Analyzer model TA-XT2 ex Stable Micro Systems, Surrey England using the TPA program, is employed. The 2 pieces of equipment are fully comparable except that the TA-XT2 model can measure more firm products. It has a load cell capacity of 25 kg. Also with this equipment a 4.4 mm round cylinder, a penetration depth of 10 mm and a penetration rate of 2.0 mm/s are employed. In this manner the firmness of samples can be characterised in a consistent yet accurate manner, irrespective of whether the sample is more or less firm. For convenience, the hardness measured is indicated as St or Stevens value expressed in grams, irrespective of which equipment is used.

Preferably the lamination dispersion used in the process has a Stevens value at 20° C. of 150–2000 g, more preferably 200–1500 g, most preferably of 300–1200 g. Dispersions with Stevens values of e.g. 1500–2000 g would in many cases be found rather hard for direct rolling-in in a pre-dough. However, bakers often have the habit of subjecting a lamination dispersion to working, e.g. by kneading and/or rolling it, before combining the dispersion with the pre-dough and effecting the lamination. Such a working treatment reduces the firmness of the dispersion, e.g. by 30–80%. Other bakers, and especially also plant bakeries, do not have the habit to work the lamination dispersion manually before folding it into the pre-dough and laminating the combination. However, in some such cases, e.g. in some plant bakeries, the dispersion may be subjected to some working by passage through e.g. a fatpump or extruder, before it is folded into the pre-dough If pre-working of the lamination dispersion is not applied, the lamination dispersion can suitably be somewhat softer than in case pre-working is applied.

In some recipes for making laminated dough for example first flour and water and possible other ingredients are combined and kneaded into a pre-dough, and subsequently the lamination dispersion is folded into the pre-dough. In other recipes for example the lamination dispersion is cut into little cubes or sticks e.g. of 2–5 $cm^3$ which are mixed with flour. Then water is incorporated, using e.g. a Diosna® kneader. All such recipes are encompassed in the expression "combining a pre-dough with a lamination dispersion".

The invention also encompasses laminated dough that comprises the present lamination dispersion and/or that has been prepared by the present process. It further encompasses wholly or partially baked laminated product obtained by baking and/or microwaving such a laminated dough, wherein optionally prior to baking and/or microwaving the dough has been rested, thawed, proofed and/or stored and wherein optionally the baking and/or microwaving has been interrupted.

Preferred embodiments of the process are given in claims 2–7 and 8, preferred embodiments of the lamination dispersion are given in claim 9. Particular embodiments of the laminated dough are given in claim 10. Preferably the present process is carried out using the edible lamination dispersion of the invention.

Throughout this specification all percentages, parts and proportions are by weight, unless otherwise indicated. Amounts of hydrocolloids are expressed relative to the weight of the non-fat contents of the dispersion. Amounts of other materials are calculated on the weight of the total dispersion including its fat contents if any, unless indicated otherwise.

The pH of the lamination dispersion should be 5.0 or less to get good keepability of the lamination dispersion and prevent microbial growth. The low pH can also contribute to obtaining a good quality of the resulting baked product, both with respect to the specific volume as well as the taste of the product. Preferably, the pH of the lamination dispersion is 1.5–5.0, more preferably 2–4, especially 3–3.5.

We found it preferable to achieve good keepability of the lamination performance by using a low pH optionally in combination with preservative rather than e.g. by using a low water content to achieve a low water activity. We found that products with very low water contents, e.g. 25% or less, with respect to the non-fat contents of the product were difficult to prepare, did not have the proper rheology and were not liked by the baker because it could not be used with good results in the conventional lamination procedures. Furthermore the high required contents of modified starches, gums, fillers and the like made the product expensive, raised its caloric content and tended to adversely affect the structure taste and mouthfeel of the baked end product.

On the other hand, we found, when aiming for lamination dispersions with a pH below 5.0, mostly in the range of 1.5–5.0, often gave rise to complications for formulations containing significant amounts of protein. Depending on the type of protein and the pH, substantial variations occurred in the viscosity of the formulation during preparation and in the structure and rheology of the ready lamination dispersion. Furthermore, depending on the composition used, pasteurisation of the whole formulation often was not possible if the right rheology was to be obtained for the lamination dispersion. Therefore, the lamination dispersion should preferably substantially not contain protein. Protein should preferably not deliberately be included in the dispersion as ingredient to have a significant influence on the structure of the product. Minor amount of protein may be tolerated. We also found that in case substantial amounts of protein were used, relatively high amounts of acid were required to reach a pre-set pH. We observed that in such cases this may result in an adverse influence on the taste of the resulting baked end product. For this reason also, the lamination dispersion should preferably not contain substantial amounts of protein. Preferably, the lamination dispersion should comprise, calculated on its non-fat contents, less than 5%, more preferably less than 3%, especially less than 1% protein. Most preferably, the lamination dispersion does not contain protein at all.

To get good results, we found that the lamination dispersion should comprise at least 2 polysaccharide hydrocolloids, one of which should be an aggregate forming gelling hydrocolloid and one of which should be a non-gelling, thickening hydrocolloid.

Each of the gelling hydrocolloid and the non-gelling hydrocolloid can be a single substance or a combination of 2 or more gelling hydrocolloids and non-gelling hydrocolloids, respectively.

The non-gelling hydrocolloid can also be a hydrocolloid that would gel, however not in the form of an aggregate, if used at a high concentration, but that is incorporated in the dispersion at a level too low to cause gelation, i.e. at below its critical concentration. The critical concentration of a gelling agent in a particular dispersion can be determined as described in Br. Polymer J. 17 (1985), 164. If a mixture of gelling agents is used, the critical concentration of that mixture can be determined in an analogous manner. A further description of methods for assessing complex gel systems is given in J. Colloid and Interface Sci. 81 (1981), 519.

The lamination dispersion should comprise an aggregate-forming polysaccharide gelling agent. The aggregates formed by the aggregate forming gelling agent preferably have a compact shape (i.e. with dimensions in the three directions not largely different) rather than a long, thin rod-like shape. The gel formed by an aggregate forming gelling agent consists of a three-dimensional network wherein the units composing the network are particles much larger in size than the molecules of the gelling agent itself. This usually means that the network will be based on units larger than 0.01 $\mu$m diameter (or thickness, in case of rod-like aggregates).

Whether a gel forming agent is an aggregate forming gelling agent can be determined for example by measuring the turbidity of the gel or by use of an electron microscope as described in EP 0 298 561. Preferably, the dispersion comprises aggregates having a mean size of 0.01–10 µm, more preferably 0.05–5 µm. Preferred aggregate forming polysaccharide gelling agents and the amounts in which they are preferably employed (on non-fat contents) are:

| Preferred aggregates forming polysaccharide gelling agents | Preferred amounts applied (on non fat contents) |
|---|---|
| maltodextrin, DE < 15, preferably 1–10, more preferably 2–5 | 17–43%, preferably 20–40%, especially 24–36% |
| polyfructose | 25–55%, preferably 30–50% |

Suitable maltodextrins can for example be prepared by hydrolysis of potato starch, e.g. Paselli SA2®, and maize starch, e.g. N-Lite-B®. A suitable polyfructose is for example Raftiline LS®, an inulin ex Tienen Sugar Belgium.

Especially the maltodextrins are preferred for use as the aggregate forming polysaccharide gelling hydrocolloid. The aggregates of the gel formed have a compact shape. The gel structure obtained when using polyfructose is more needle-like. When preparing the laminated dough, we found that lamination dispersions with maltodextrin gels softened relatively little upon working, while lamination dispersions with polyfructose gels showed more softening during working. We believe this difference in work-softening to be attributable to the difference in aggregate type of the gel. In particular maltodextrin prepared from potato starch, especially by enzymic hydrolysis, is preferred for use in the lamination dispersion. Paselli SA2 ex Avebe Netherlands is an example of such a maltodextrin.

When using maltodextrin as the aggregate forming polysaccharide gelling agent we found it preferable not to use maltodextrin derived from oat. When evaluating the use of such maltodextrin, e.g. Quaker® Oatrim or Trim Choice®, in the desired concentrations, we found that the maltodextrin was difficult to disperse and the composition was very viscous and difficult to handle during processing. The resulting product tended to be rather sticky and it was not easy to prepare the laminated dough compared with lamination dispersions prepared with maltodextrin from other sources, e.g. potato. We do not fully understand this phenomenon but we think that oat may comprise minor components, possibly fibres, such as β-glucans which end up in hydrocolloid preparations derived from oat and which adversely affect the performance of the hydrocolloid in the present application. Therefore we prefer to apply compositions that are substantially free of β-glucans The type and amount of non-gelling polysaccharide thickening hydrocolloid contained in the lamination dispersion should be such that it provides at 20° C., and a shear rate of 50 s$^{-1}$ a viscosity of at least 50 mPas. The concentration of this hydrocolloid, calculated on the non-fat contents of the lamination dispersion, should be 0.1–8%, preferably it is 0.25–5%, especially 1–3%.

We found that if the viscosity is too low, e.g. when using pentosans, the resulting lamination dispersion is crumbly and does not perform well during the lamination. We also found that if high amounts of non-gelling polysaccharide thickening agents were employed, e.g. using starch hydrolysates with high DE values, resulting in relatively low water contents, the resulting lamination dispersions tended to get smeared into the pre-dough not giving a dough with a proper laminated structure and the resulting baked products had low specific volumes and showed much shrinkage during baking.

As already mentioned above, as non-gelling thickening agent, an agent that can form a gel may be used provided it is used at a concentration below its critical concentration. The viscosity provided by a thickening agent, as well as the concentration at which it can form a gel, may for certain hydrocolloids, notably alginates and carrageenans, be influenced by the type and amount of electrolytes present. To take such effects into account, the properties of the non-gelling, thickening agent are suitably assessed by making up the composition as intended for the lamination dispersion, except for the gelling hydrocolloid and the oil or fat, if any, and confirming that the composition thus obtained does not form a gel and has a viscosity at 20° C. and a shearrate of 50 s$^{-1}$ of at least 50 mPas. The viscosity provided by the non-gelling, polysaccharide thickening hydrocolloid, thus measured, preferably is 100–30000 mPas, more preferably 200–15000 mPas.

Best results are obtained when using as non-gelling polysaccharide thickening agent gum hydrocolloids, provided that at the amount employed, taking into account the electrolytes present in the composition, they give appropriate viscosity and do not gel. By gum hydrocolloids are meant plant or microbial polysaccharides or their derivatives that are dispersible in cold or hot water to produce viscous mixtures or solutions at low concentrations i.e. about 1%. Thus, cellulose, starch and hydrolysed starch are not considered gum hydrocolloids because relatively high concentrations i.e. about 10% are required to obtain viscous mixtures or solutions or they may not be properly dispersible at all. However, gum hydrocolloids can be obtained using starch or cellulose as starting material (See e.g. R. L. Whistler Industrial gums, Academic Press, New York, (1973) pages 5–10). Colflo®67 ex National Starch and Chemicals, Zutphen Netherlands, a chemically cross-linked starch product prepared from waxy maize is an example of a gum hydrocolloid derived from starch, that can be used in the present invention. Preferably, however, gum hydrocolloid not derived from starch is used. Preferred gum hydrocolloids are locust bean gum, guar gum, sodium carboxyl methyl cellulose, gum arabic, alginate and carrageenan, and combinations of 2 or more thereof. When using combinations, however, it should be kept in mind that some gums that do not form a gel when used alone, may cause gelation to occur when used in combination. This may for example occur when applying locust bean gum and xanthan gum together. Particularly preferred non-gelling gum hydrocolloids are locust bean gum, xanthan gum and sodium carboxymethyl cellulose. It should be clear that the application of such gelating mixtures of non-gellating components are not under the scope of our invention.

The water content of the lamination dispersion used in the process should be 40–80%, expressed on the non-fat weight of the dispersion, preferably it is 50–80%. Especially when maltodextrin having a DE of less than 20 and gum hydrocolloid are used, the watercontent of the lamination dispersion is preferably 55–80%, more preferably 60–70%. We found that particularly with this combination of hydrocolloids and water content in the substantial absence of protein, excellent lamination performance and very good quality baked products can be obtained. These lamination dispersions are also very easy to prepare and can have very good open and closed shelflike.

Depending on the intended application, fat may be incorporated. If it is desired to achieve a "zero-fat" or a very low calorie baked product, the dispersion should be substantially free from fat. For other intended applications, fat may be incorporated. If fat is used, preferably up to 80%, more preferably 2–60%, especially 5–50% is employed.

Whereas fat may add unwanted calories to the product, on the other hand it may make a positive contribution to the taste and mouthfeel of the resulting baked product. However, we found that already a small amount of fat in the present invention can give an appreciable positive contribution, while raising the fat content further hardly gives additional benefit. It is therefore particularly preferred for the lamination dispersion to contain 2–20%, especially 5–10% fat.

The use of a water-continuous lamination dispersion has the advantage that it gives a much wider choice of fats that can be employed. Preferably fat is employed that has not been subjected to chemical modification, i.e. that has not been subjected to hydrogenation or interesterification. It is preferred to use fat that has also not been fractionated. Another opportunity is to employ fat with a much higher content of cis-unsaturated fatty acid residues than can be used in case of a fat-continuous lamination dispersion. Preferably, the fat employed comprises at least 50% cis-unsaturated fatty acid residues. Particularly preferred are liquid vegetable oils, e.g. soyabean oil, sunflower oil, rapeseed oil etc., and mixtures of such oils. Another preferred fat, for flavour reasons, is milk fat or fat derived therefrom, e.g. butter and butterfat. Butter itself is not a very suitable lamination dispersion, especially if it is to be employed in a bakery with a relatively high temperature, because then it is too soft. According to our invention, the beneficial taste and flavour contributions to the baked product can be obtained without adverse effects on the lamination performance. In the lamination dispersion fat, if any, is preferably present as a dispersed phase. Fat may however also be present in the dispersion as a second continuous phase in addition to the continuous aqueous phase. Preferably the fat is dispersed such that the average fat globule size is less than $100\mu$ (micron), more preferably less than $50\mu$, especially less than $25\mu$.

The lamination dispersion does not need to contain emulsifier. Especially, if the dispersion is substantially fat free there will usually not be a benefit in incorporating emulsifiers. Also when fat is incorporated at a low level, depending on the composition employed and the processing applied, a stable dispersion can be obtainable without using emulsifiers.

In other cases, especially if higher fat levels (and particularly soft fats, e.g. liquid oils) are employed, e.g. 20% or more, it may be desirable to incorporate an emulsifier or a mixture of emulsifiers.

The choice of emulsifier is not critical. Common O/W emulsifiers can be used. Preferably an emulsifier isolated from nature rather than a chemically produced one is employed. A preferred emulsifier is phospholipid, especially phospholipid that has not been subjected to chemical modification such as hydrolysis. A particularly preferred emulsifier is soybean lecithin that has not been hydrolysed. If emulsifier is included in the dispersion, it is preferably employed in an amount of 0.1–5% particularly 0.2–3% calculated on the weight of the dispersion.

The lamination dispersion may comprise apart from water, fat, hydrocolloids, emulsifier and food grade acid or a buffer system (e.g. lactic acid or citric acid) to obtain the desired pH, other ingredients that are commonly employed in lamination dispersions, e.g. preservatives, colorant, flavour etc.

A further advantage of the present invention is that dough improvers can be incorporated. Normally, fat continuous lamination dispersions do not include additives intended to act as dough improvers. Such improvers act on the flour of the dough or serve as food for yeast, if present. In fat continuous lamination dispersions with a dispersed aqueous phase such dough improvers would be trapped in the fat and would only reach the flour/yeast when the fat melts during baking. At such a late stage, such dough improver cannot be very effective anymore. In the present invention, such dough improvers are present in the continuous aqueous phase. Therefore, they can already migrate to the flour/yeast during the lamination process. For example, in the lamination dispersion, beneficially small amounts of ascorbic acid or sugar can be included.

This can be particularly suitable for yeasted lamination doughs, e.g. doughs for croissants or Danish pastry. In such cases, e.g. 2% of sugar calculated on the amount of flour in the dough, but supplied by the lamination dispersion, can already be effective. The amount of sugar to be incorporated in the lamination dispersion then of course depends on the intended dough recipe. Preferably the amounts of pre-dough and lamination dispersion are such that the weight ratio of flour to lamination dispersion is between 1:0.4 and 1:1.2. Accordingly, a small amount of sugar e.g. 1–5% in the lamination dispersion can already be effective.

For good lamination performance it is desirable that the dispersion has a smooth texture and is substantially free of lumps. Depending on the composition and process for preparing the lamination dispersion employed, it may be appropriate to subject part or all of the composition that is to constitute the dispersion, to a homogenisation treatment, e.g. by passing it through a colloid mill or a high pressure homogenizer. Preferably the lamination dispersion is substantially free from particles bigger than $100\mu$, more preferably it is substantially free from particles bigger than $50\mu$, especially $25\mu$.

The dispersion can be prepared in many different ways. For example, water can be heated, e.g. to 95° C., the hydrocolloids and other ingredients are added while stirring to obtain a homogeneous mixture. The product is filled hot in a suitable container and it is allowed to cool down at rest, e.g. by storage at 15° C. Alternatively, the hot mixture can be cooled down, e.g. by passage through a tubular heat exchanger and the product exiting therefrom is filled in containers and allowed to rest. If fat is employed, it is preferably included in liquid form. Thus it may be appropriate to heat the fat such that it is completely molten before admixing it with the other components.

To disperse the fat, high speed stirring can be sufficient, but the composition may also be homogenized in another way, e.g. by passage through a colloid mill. If the composition comprises emulsifier such as lecithin, this can suitably be incorporated by first dispersing it in the molten fat.

After preparation of the lamination dispersion, before using it in the process for preparing the laminated dough, the product should be stored for a sufficiently long period for the hydrocolloid structure to fully develop. How long this will take depends on the composition employed and the storage temperature, but 3–7 days at e.g. 5° C. will in practice nearly always be sufficient.

In addition to using low pH in the lamination dispersion, further improvement of the keepability can be obtained by the presence of salt or other preservatives such as potassium sorbate and sodium benzoate, hygienic or aseptic processing and packaging material, the use of a heattreatment sufficient to pasteurize or sterilize the product, e.g. UHT treatment for 4 minutes–4 seconds at 120–140° C., or a combination of such measures.

The lamination dispersion can be used in the preparation of laminated dough, e.g. for croissants, Danish pastry and puff pastry, in the usual way. Normally the lamination dispersion is taken from cooled storage and placed at bakery temperature, e.g. 20° C., 1 day before the dough preparation. To prepare the dough, first a pre-dough is prepared suitable for the intended application, optionally the lamination dispersion as such may be pre-worked, e.g. by rolling it out, the dispersion is put on the pre-dough, which is folded around it, and the combination of pre-dough and lamination dispersion is rolled and folded a number of times, optionally with intermediate or subsequent resting stages. As already mentioned above, pre-dough and lamination dispersion can also be combined e.g. by mixing pieces of lamination dispersion into flour and optional other ingredients and subsequently incorporating water and possible further materials still to be added. The dough preparation is preferably carried out such that the laminated dough comprises up to 800, more preferably 4–200 layers of lamination dispersion. It is an advantage of the present invention that baked products with good structure can be obtained using laminated dough with relatively few layers. Thus the required amount of handling is reduced. It is particularly preferred for the process to be carried out such that the resulting dough comprises 8–100 layers of lamination dispersion.

If so desired, in addition to the present lamination dispersion also another, e.g. a conventional fat continuous lamination dispersion can be incorporated in the laminated dough. For example, first half of the usual amount of lamination dispersion of the present invention is folded into a pre-dough. The combination is once rolled and folded. Then a similar amount of the other lamination dispersion is folded into the dough and rolling and folding is completed as usual. In this way the dough will comprise layers of each of the lamination dispersions.

The laminated dough can subsequently, optionally after having been proofed if applicable, be baked to obtain the end product. If the product is not consumed shortly after baking, if so desired the product can be reheated before it is eaten. It is also possible to include an intermediate storage stage, wherein the laminated dough is chilled or frozen or preserved otherwise, optionally packed, and kept for some time before it is baked. In this way, for example, the laminated dough can be sold as such to the consumer, allowing him or her to prepare freshly baked products at home in a very easy way. If the dough needs proofing, e.g. for croissants, such intermediate storage can be carried out prior to, or after part or all of the required proofing. Thus the lamination dispersion can be employed for preparing for example pre-proofed or ready-to-bake laminated doughs as e.g. described in EP 493 850, EP 542 353, WO 93/22928 or PCT/EP94/04165. The lamination dispersion can also be used for preparing microwaveable laminated doughs for pastries, croissants and the like. Similarly it can be used for preparing "partially baked" products, e.g. wherein baking and/or microwaving is interrupted, the product is optionally frozen or preserved otherwise, packed and sold and the customer only needs to apply a short residual baking and/or microwaving treatment.

The lamination dispersion is not only suitable for preparing conventional laminated dough products such as puff pastries, croissants and Danish pastries. Numerous other applications present themselves for the lamination dispersion, and the laminated dough. For example pastries can be prepared which contain a sausage which is folded into the laminated dough and baked with it, fruit pieces can be incorporated etc.

In the following examples, the laminated doughs are prepared for making croissants or puff pastry as follows:

Puff pastry (pencil method):

For the pre-dough 500 g flour and approximately 270 g water is used. (The precise amount of water depends on the flour type. The Farinograph water absorption value minus 4% was used). 400 g of the lamination dispersion is cut in pieces of about 1×1×4 cm and mixed with the flour. The water is added to this mixture in a small Diosna® kneader, and the Diosna is operated for about 50 strokes. The composite dough (pre-dough combined with lamination dispersion) is rolled out via dial positions on the "rolling machine" (pastry brake) to a layer of pre-determined thickness in the following steps: 25-20-15-10-8 mm. The piece of dough is folded in three, turned 90° and rolled out as before. It is folded again in 3, turned 90° and rolled out as before. Then it is folded again in 3 and rolled out via the dial positions on the rolling machine with the following steps: 24-20-15-turn 90°-12-8-6-turn 90°-4-3.75 mm. Thus, a laminated dough with 27 layers of lamination dispersion separated by layers of pre-dough is obtained. The intermediate folding in 3, rolling and turning sequence can be repeated once more to obtain a dough with 81 layers of lamination dispersion.

Dough pieces for vol au vents of standard size and shape are cut from the dough and put on a baking plate. They are allowed to rest and baked in a preheated oven for about 20 minutes at 240° C.

Croissants:

Croissant pre-dough is prepared using the following recipe:

| Flour | 1000 parts |
|---|---|
| Yeast | 50 parts |
| Salt | 20 parts |
| Dough improver | optional |
| Water | 580 parts |

The pre-dough is prepared by kneading all the ingredients for 2 minutes at speed 1 and for 4 minutes at speed 2 in an Eberhardt® spiral kneader. The pre-dough is allowed to rest for 10 minutes.

Lamination: flour/lamination dispersion in 1/0.8 ratio. 2× folded in 4=16 layers.

Proofing: for 60 minutes at 32° C. and 85% RH.

Baking: for 18 minutes at 220° C. in a pre-heated Wachtel® oven, initially applying a steam injection during 5 seconds.

Usually the lamination dispersion is pre-worked before combining it with the pre-dough. Pre-working is done by rolling out the lamination dispersion on the pastry brake to 10 mm thickness, folding it in three and rolling it out again to 10 mm thickness.

With respect to baking trials it should be kept in mind that only comparisons should be made between products baked in a single series of trials. Many external factors can influence the results, e.g. the temperature and humidity of the bakery and the type of flour, its age and storage history. The same applies for yeast, if used. Especially the flour can have a big influence. If a lot of flour is split in two parts, one stored for 3 weeks at 20° C. and the other at 5° C., perceivable differences in dough handling and properties of baked product may result. Therefore, comparisons should only be made between trials from the same series.

EXAMPLES

Example 1

66 Parts tapwater was heated to 95° C. and put in a Waring blender®. 32 Parts Paselli SA2® (ex Avebe, Netherlands, DE=2, maltodextrin from potato starch) was stirred in and subsequently 2 parts locust bean gum were added. Citric acid and $Na_2HPO_4$ were included to obtain a pH of 3.5. The mixture was left to stand for 10 minutes at 85° C. while stirring to allow the locust bean gum to develop viscosity and to pasteurize the mixture. The composition was then poured into aluminium containers and stored at 5° C. for 1 week. The lamination dispersion was kept at 20° C. for 24 hours before evaluation in croissant making.

The preparation was also carried out in the same way without using Paselli SA2. The composition did not gel. It had a viscosity at 20° C. and a shearrate of 50 $s^{-1}$ as measured with a Rheolab MC 100/UM100(ex Physica Messtechnik, Stuttgart Germany) of 12000 mPas.

The Stevens value of the lamination dispersion at 20° C. was 360 g. For the pre-dough, 40 parts of dough improver comprising conventional ingredients such as sugars, soya flour, malt flour, DATA ester, a-amylase and other enzymes and ascorbic acid was used. The lamination dispersion was judged by the baker to have a good, plastic structure. Lamination behaviour was good and so was the baking performance. The resulting croissants had a specific volume (S.V.) of 7.8 ml/g. Both the internal and the outside structure of the croissants was very good. Also the eating quality of the croissants was acceptable although compared with conventional full fat croissants made with an 80% fat continuous lamination margarine, they were a bit tough. Both the open and the closed shelflike of the lamination dispersion were good.

Examples 2–4

For example 2, example 1 was repeated except that 30 parts of a different batch of Paselli SA2 was employed and that the amount of water was adapted to 68 parts.

For example 3, 90 parts of the composition of example 2 was combined with 9.3 parts Biskien Korst® ex Union Belgium, a commercial lamination margarine and 0.7 parts natural soybean lecithin. The lamination dispersion was prepared by cooling the composition of example 2 from 95° C. to 55° C. and pouring it in a Kenwood mixer, heating the Biskien Korst and lecithin to 55° C. at which temperature it was completely molten and slowly adding it to the mixer while stirring at low speed. Stirring was continued for 2 more minutes and the composition was poured in aluminium containers and stored at 5° C.

Example 4 was carried out as example 3 except that 60 parts of the composition of example 2 was combined with 3 parts of stabilised egg yolk as emulsifier and 37 parts of Biskien Korst.

For the lamination dispersion of example 3, microscopic investigation showed that the fat was present as a finely dispersed phase. The product of example 4 was bi-continuous, both the aqueous phase and the fatphase were continuous.

The Stevens values of the products were 420, 460 and 320 g. for examples 2, 3 and 4, respectively. The dispersions were pre-worked (after which their Stevens values were 230, 245 and 165 g, respectively) before combining them with the pre-dough.

The resulting croissants had S.V.'s of 11.1, 9.7 and 9.4 ml/g for examples 2, 3 and 4, respectively. Otherwise the result were similar as for example 1 except that the presence of fat in examples 3 and 4 notably reduced the toughness when eating the product, and that the lamination dispersion of example 4 was not as plastic but somewhat crumbly during the lamination.

Part of the lamination dispersions of examples 2, 3 and 4 were kept deepfrozen for a period of 2 weeks. Subsequent evaluation of these samples in croissants confirmed that the products were not adversely affected by the frozen storage.

Example 5

Example 3 was repeated except that 95% composition of example 2 was combined with 5% of Biskien Korst. The results were very similar to those of example 3. There was substantially no difference in the toughness reducing effect of the fat in examples 3, 4 and 5, which shows that already 5–10% fat can be sufficient to obtain this benefit.

Example 6

Example 1 was repeated except that 33 parts of the Paselli SA2 was used and that the locust bean gum was replaced by 0.5% sodium carboxymethyl cellulose.

The composition without the Paselli SA2 had a viscosity at 20° and 50 $s^{-1}$ shearrate of 204 mPas (measured with a Haake Viscometer (type Rotovisco RV3)).

The lamination dispersion was plastic and had a Stevens value at 20° C. of 250 g. The resulting croissants had an S.V. of 10 ml/g. Otherwise, the performance during lamination and the quality of the resulting products were also acceptable.

Example 7

The lamination dispersion of example 4 was used for preparing puff pastries using the pencil method described above, and also using the well known "French method" in which the pre-dough is folded around a sheet of lamination dispersion and the composite dough is rolled on the pastry brake and folded to obtain a plurality of layers, similar to the procedure in the pencil method.

The number of layers in the pencil method was 27, with the French method 81 layers were applied. With both methods pastries with acceptable lift, very little top shrinkage and a good structure were obtained, the pastries prepared with the French method being preferred over those of the pencil method.

Example 8

Example 2 was repeated except that instead of Paselli SA2, maltodextrin from oat, Trim Choice® ex Staley, Decatur, USA was used. Trim Choice is known to comprise as minor constituents about 5% β-glucan and about 2% pentosans. Whereas pentosans do not form a gel and contribute little to viscosity, the role of β-glucan is not well known, since isolated β-glucan is not readily available and so far little research has been done to investigate this component. It is however believed that at concentrations of β-glucan above 1%, gelation may take place.

Lamination performance of the lamination dispersion was acceptable, although the product was somewhat sticky. The resulting croissants were also acceptable. However, the preparation of the lamination dispersion was rather difficult.

Whereas the resulting lamination dispersion had a firmness not very different form that of Example 2, the viscosity during preparation became very high. The Waring blender could no longer cope with the composition and stirring had to be done by hand. This difficulty already occurred before inclusion of the gum. The end composition could no longer be poured and had to be transferred to the containers by spooning. Similar problems were observed when using another maltodextrin from oat, Quaker® Oatrim ex Rhône Poulenc, USA. Because of these difficulties, as well as the less than optimal performance during lamination, it is preferred to avoid the use of maltodextrin from oat.

Comparative Examples A–C

For comparison A, example 2 was repeated except that it comprised as hydrocolloids 20% Paselli SA2 and 35% Avebe MD20 ex Avebe Netherlands. The water content was 43%, the dry matter of the buffersystem corresponded to 2%.

The composition without the Paselli SA2 did not gel. Avebe MD 20 has a DE of 20.

As described for example 3, comparison B was made by combining 90 parts of comparison A composition with 9.3 parts of Biskien Korst and 0.7 parts natural soybean lecithin.

Comparison C was prepared similar to comparison B but combining 80 parts of the composition of comparison A with 19 parts of Biskien Korst and 1 part lecithin.

The products were soft and sticky. Lamination was difficult. The resulting croissants were unacceptable, having S.V. values between 4.5 and 5.3 ml/g., and poor structure and shape.

Comparative Example D

This trial was done to evaluate the teaching of WO 94/28741 (or WO 95/26641).

| Composition used: |
| --- |
| 27.4% butter |
| 46.8% Paselli SA2 (DE2) |
| 6.1% Avebe MD 20 (DE20) |
| 8.1% Instant clear gel (pre-gelatinized starch) |
| 0.5% Whey protein |
| 0.2% Xanthan gum |
| 10.9% Water |

The butter was creamed at ambient temperature in a Kenwood mixer operating at lowest stirring speed. Gradually the dry ingredients and the water were added to the butter while stirring. The mixer was covered to prevent excessive dusting. Mixing was continued for another 3 minutes at higher speed.

During addition of the mix of dry ingredients initially a homogeneous mass with butter was formed, which changed into a crumbly incoherent material when all the ingredients were added. The water added could not correct this.

Also with further kneading by hand a coherent material could not be formed that could usefully have been evaluated for preparing laminated dough.

The composition disclosed here therefore contains far less water than the compositions according to the invention. Just addition of water in order to adjust the waterlevel to the waterlevel of our composition, is impossible, because this would e.g. lead to insufficient levels of the non-gelling agent (=xanthan gum).

Comparative Example E

Example 2 was repeated except that 33 parts Paselli SA2, 3 parts Xylan® and 64 parts water were used. Xylan is a pentosan composition from oat spelts ex Sigma, available from Aldrich Chemie, Bornem, Belgium.

The composition without the Paselli SA2 had a viscosity at 20° C. and a shearrate of 50 s$^{-1}$ of only 10 mPas.

The resulting lamination dispersion had a Stevens value at 20° C. of 515 g which reduced by pre-working to 245 g. Although in the end acceptable croissants were obtained, the product was very difficult to handle. It was very crumbly and had to be heavily kneaded by hand before lamination could usefully be attempted. The baker strongly rejected the product.

What is claimed is:

1. Process for preparing an edible laminated dough comprising combining a pre-dough with a lamination dispersion and subjecting the combination to rolling and folding to obtain a plurality of layers, wherein the lamination dispersion is a water-continuous dispersion, characterised in that the lamination dispersion has a pH of 5.0 or less and that the lamination dispersion comprises, calculated on the non-fat content of the lamination dispersion

| | |
| --- | --- |
| 40–80% | water |
| 17–55%, [preferably] aggregate forming [polysaccharide] polysaccharide [17–40%] gelling hydrocolloid, and | |
| 0.1–8% | non-gelling polysaccaride thickening hydrocolloid that provides at 20° C. and a shearrate of 50s$^{-1}$ a viscosity of at least 50 mPas. |

2. Process according to claim 1 wherein the aggregate forming polysaccharide gelling hydrocolloid is maltodextrin having a DE of less than 20.

3. Process according to claim 2 wherein the maltodextrin is not derived from oat.

4. Process according to claim 1 wherein the non-gelling polysaccharide thickening hydrocolloid is a gum hydrocolloid.

5. Process according to claim 1 wherein the lamination dispersion further comprises fat up to 80% of the total weight of the lamination dispersion.

6. Process according to claim 1 wherein the combination of pre-dough and lamination dispersion is rolled and folded to obtain a dough comprising 4–200 layers of lamination dispersion.

7. Process according to claim 1 wherein pre-dough and lamination dispersion are combined in amounts such that a weight ratio of flour in the pre-dough and lamination dispersion is between 1:0.4 and 1:1.2.

8. Process according to claim 1 wherein the lamination dispersion is a continuous aqueous phase and has a pH of 5.0 or less and a Stevens value at 20° C. of 150–2000 g, and comprises

| | |
| --- | --- |
| 55–80% | water, |
| 20–40% | maltodextrin having a DE of less than 20, and |
| 0.25–5% | non-gelling polysaccharide gum hydrocolloid that provides at 20° C. and a shearrate of 50 s$^{-1}$ a viscosity of at least 50 mPas. wherein the percentages are calculated on the non-fat contents of the dispersion, and wherein the dispersion substantially does not contain protein. |

9. The process of claim 1, wherein the lamination dispersion is further characterised as substantially free of protein.

10. The process of claim 1, wherein the lamination dispersion comprises less than 5% protein calculated on the non-fat content of the lamination.

* * * * *

UNITED STATES PATENT AND TRADEMARK OFFICE
CERTIFICATE OF CORRECTION

PATENT NO.   : 6,099,887
DATED        : August 8, 2000
INVENTOR(S)  : Van Eendenburg et al.

It is certified that error appears in the above-identified patent and that said Letters Patent is hereby corrected as shown below:

ABSTRACT,
Line 4 of the table, delete "polysaccaride" and insert in its place -- polysaccharide --.

ABSTRACT, following the table, insert the paragraph -- Also an edible lamination dispersion for use in this process is described. The use of the water continuous lamination dispersion allows obtaining pastries, croissants and other laminated baked products with good sensoric properties and with reduced fat and calories or with more natural and/or more healthy fat. Also lamination performance in dough making is good. --.

Column 4,
Lines 6-7, remove from the table "which dispersion substantially does not contain protein." and insert after the table.
Line 49, delete "weighing" and insert in its place -- Weighing --.

Column 13,
Line 18, delete "a-amylase" and insert in its place -- α-amylase --.

Column 16,
Lines 21 and 22 delete "[preferably]", "[polysaccharide]" and "[17-40%]".

Signed and Sealed this

Eighteenth Day of December, 2001

*Attest:*

JAMES E. ROGAN
*Attesting Officer*   *Director of the United States Patent and Trademark Office*